(12) United States Patent
Shimizu et al.

(10) Patent No.: US 7,460,341 B2
(45) Date of Patent: Dec. 2, 2008

(54) MAGNETIC DISK DEVICE AND SUSPENSION HAVING MULTIPLE ARM PORTIONS OF VARYING LENGTHS

(75) Inventors: Toshihiko Shimizu, Ibaraki (JP); Haruhide Takahashi, Kanagawa (JP); Kousaku Wakatsuki, Kanagawa (JP); Keiko Watanabe, Ibaraki (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 499 days.

(21) Appl. No.: 11/197,993

(22) Filed: Aug. 5, 2005

(65) Prior Publication Data

US 2006/0028768 A1    Feb. 9, 2006

(30) Foreign Application Priority Data

Aug. 5, 2004    (JP) .............................. 2004-228923

(51) Int. Cl.
G11B 5/55    (2006.01)
G11B 21/08    (2006.01)

(52) U.S. Cl. .................................................... 360/266

(58) Field of Classification Search .............. 360/244.5, 360/265.7, 265.8, 265.9, 266, 266.1
See application file for complete search history.

(56) References Cited

U.S. PATENT DOCUMENTS

| | | | | |
|---|---|---|---|---|
| 4,346,416 A * | 8/1982 | Riggle et al. | ............. | 360/265.7 |
| 4,947,275 A * | 8/1990 | Hinlein | .................... | 360/244.5 |
| 5,142,424 A * | 8/1992 | Hatamura | ................ | 360/244.2 |
| 5,491,598 A * | 2/1996 | Stricklin et al. | .......... | 360/265.7 |
| 5,731,932 A * | 3/1998 | Crane | ..................... | 360/244.5 |
| 5,805,388 A * | 9/1998 | Engwall | .................... | 360/266 |
| 6,407,888 B1 * | 6/2002 | Crane | ..................... | 360/244.5 |
| 6,961,218 B1 * | 11/2005 | Lin et al. | .................... | 360/266 |

* cited by examiner

Primary Examiner—Craig A Renner
(74) Attorney, Agent, or Firm—Townsend and Townsend and Crew LLP; Darren Gold (57) ABSTRACT

Embodiments of the invention suppress head jump at the time of application of an impact to provide for an excellent impact resistance performance in a magnetic disk device. In one embodiment, an actuator of a magnetic disk device comprises a suspension mounting the slider on a tip end side thereof to give a predetermined load to the slider, and an arm that holds the suspension, the arm being supported to be able to turn. The arm comprises two arm portions juxtaposed in a direction perpendicular to a surface of the disk, and a spacing between the two arm portions on a side of supported portions thereof in the direction perpendicular to the surface of the disk is larger than that on a side of the slider in the direction perpendicular to the surface of the disk.

16 Claims, 13 Drawing Sheets

PRIOR ART

PRIOR ART

MAGNETIC DISK DEVICE AND SUSPENSION HAVING MULTIPLE ARM PORTIONS OF VARYING LENGTHS

CROSS-REFERENCES TO RELATED APPLICATIONS

This application claims priority from Japanese Patent Application No. JP2004-228923, filed Aug. 5, 2004, the entire disclosure of which is incorporated herein by reference.

BACKGROUND OF THE INVENTION

The present invention relates to a magnetic disk device, and is specifically suited to a magnetic disk device provided with an actuator, which comprises a suspension mounting a slider thereon and an arm that supports the suspension.

Conventional and general magnetic disk devices comprises a disk that records information, a slider mounting thereon a magnetic head that records or reproduces information from the disk, and an actuator mounting thereon the slider on a tip end side thereof and provided to be able to turn so as to move the slider radially of the disk. The actuator comprises a suspension mounting the slider on a tip end side thereof to give a predetermined load to the slider, and an arm that holds a base end side of the suspension, the arm being supported to be able to turn. See, e.g., JP-A-2004-164703 (Patent Document 1).

BRIEF SUMMARY OF THE INVENTION

As a portable type information-processing equipment, such as a notebook personal computer, an MP3 player, etc., in which a magnetic disk device is built, becomes widespread, the impact resistance performance of a magnetic disk device becomes an important index. Also, when the impact resistance performance is improved, it is possible to reduce damage caused by an impact generated at the time of manufacture and shipment of a magnetic disk device, and consequently it is possible to reduce the manufacturing cost of a magnetic disk device.

Here, as far as factors related to the impact resistance performance of conventional magnetic disk devices are examined, it has been found that a phenomenon called head jump constitutes an important factor. This phenomenon is one in which a slider mounting thereon a magnetic head, which flies above a disk with a minute gap therebetween, jumps up from a surface of the disk due to an impact force from outside of a magnetic disk device and then collides against the surface of the disk. When head jump causes the slider to strongly collide against the disk, there is a fear that information recorded on the disk is damaged and the disk and the slider themselves are broken, so that the magnetic disk device cannot operate normally.

In order to maintain a state in which a slider flies appropriately above a surface of a disk, the slider is put in a state of being pushed against the disk by a suspension that holds the slider. When an impact is applied on a magnetic disk device and an inertial force generated on the slider and the suspension thereby acts in an opposite direction to the pushing force on the slider, the pushing force on the slider is decreased. In the case where the inertial force is larger than the pushing force on the slider, the slider is peeled off from the surface of the disk and head jump is generated. Further, since an arm itself supporting the suspension is deformed in a direction, in which the slider is peeled off from the surface of the disk, at the time of application of an impact, head jump is liable to occur.

With conventional magnetic disk devices, lightening of the suspension itself has been promoted as measures to counter head jump. While lightening of the suspension is effective in avoiding head jump, various restrictions are actually involved. With a view to lightening of the suspension, there are adopted measures such as thinning of a sheet material that constitutes the suspension, shortening of the suspension, etc. However, the former involves a problem that worsening of the vibration characteristic is caused due to lowering of the suspension in stiffness and the positioning accuracy in positioning in a predetermined radial position on a disk is degraded. The latter involves a problem that it is not possible to ensure flexibility required for accommodation of assembly tolerance. In particular, in the case where the suspension is shortened in the latter, it is necessary to lengthen an arm that supports a suspension, thus the use of a long arm causes a problem of reduction in a push load, which is brought about by deformation of the arm, and there is caused a new problem that deformation of the arm gives rise to a fear of contact between a disk and the arm to damage a surface of the disk.

In addition, while an increase in a load, with which a suspension pushes a slider, constitutes effective measures to avoid head jump, a push load by the suspension cannot be increased so much in order to realize a state, in which a slider flies minutely from a surface of a disk.

It is a feature of the invention to materialize a magnetic disk device that suppresses head jump at the time of application of an impact and is excellent in impact resistance performance.

In accordance with an aspect of the invention, a magnetic disk device comprises a disk that records information, a slider mounting thereon a magnetic head that records or reproduces information from the disk, and an actuator mounting thereon the slider on a tip end side thereof and provided to be able to turn so as to move the slider radially of the disk, and wherein the actuator comprises a suspension mounting the slider on a tip end side thereof to give a predetermined load to the slider, and an arm holding the suspension and supported to be able to turn, and the arm comprises two arm portions juxtaposed in a direction perpendicular to a surface of the disk, and a spacing between the two arm portions on supported sides in the direction perpendicular to the surface of the disk is made larger than that on a side of the slider in the direction perpendicular to the surface of the disk.

Preferred specific constitutions of the invention are as follows.

(1) The two arm portions are formed from two sheet members, and the two sheet members are joined together on a side of the slider and supported to be separate from each other on the supported sides.

(2) In addition to the constitution (1), the two sheet members are fixed together on a side of a turning shaft with a spacer therebetween and the two sheet members together with the spacer are supported on the shaft.

(3) The arm portion on an opposite side to a surface of the disk is larger in length than the arm portion on a side toward the surface of the disk.

(4) In addition to the constitution (3), the arm portion on the side toward the disk is provided substantially in parallel to the surface of the disk and the arm portion on the opposite side to the surface of the disk is provided to be inclined relative to the surface of the disk.

(5) In addition to the constitution (4), the arm portion on the side toward the surface of the disk is provided substantially in parallel to the surface of the disk and the arm portion on the opposite side to the surface of the disk is provided to be inclined relative to the surface of the disk.

(6) In addition to the constitution (4), the suspension and the arm on the actuator are provided to be symmetrical on both sides of the disk.

(7) The actuator comprises the suspension, the arm, and a voice coil motor, the two arm portions are formed from two sheet members, the two sheet members are joined together on a side of the slider and fixed together on a side of a turning shaft with a spacer therebetween, the suspension and the arm on the actuator are provided to be symmetrical on both sides of the disk, a board portion of the voice coil is fixed between the arm portions on the both sides, and the two sheet members, the spacer, and the board portion of the voice coil are supported on the same shaft to be able to turn.

(8) The two arm portions are formed from elastic beams.

(9) The arm is formed from a single sheet member, which decreases in thickness toward the slider, and an opening is provided on the sheet member to form two arm portions juxtaposed in the direction perpendicular to the surface of the disk.

According to the invention, it is possible to make a magnetic disk device that suppresses head jump at the time of application of an impact and is excellent in impact resistance performance.

DETAILED DESCRIPTION OF THE INVENTION

Several embodiments of the invention will be described below with reference to the drawings. The same reference numerals in the drawings of the respective embodiments denote the same or equivalent elements.

Figure 1:
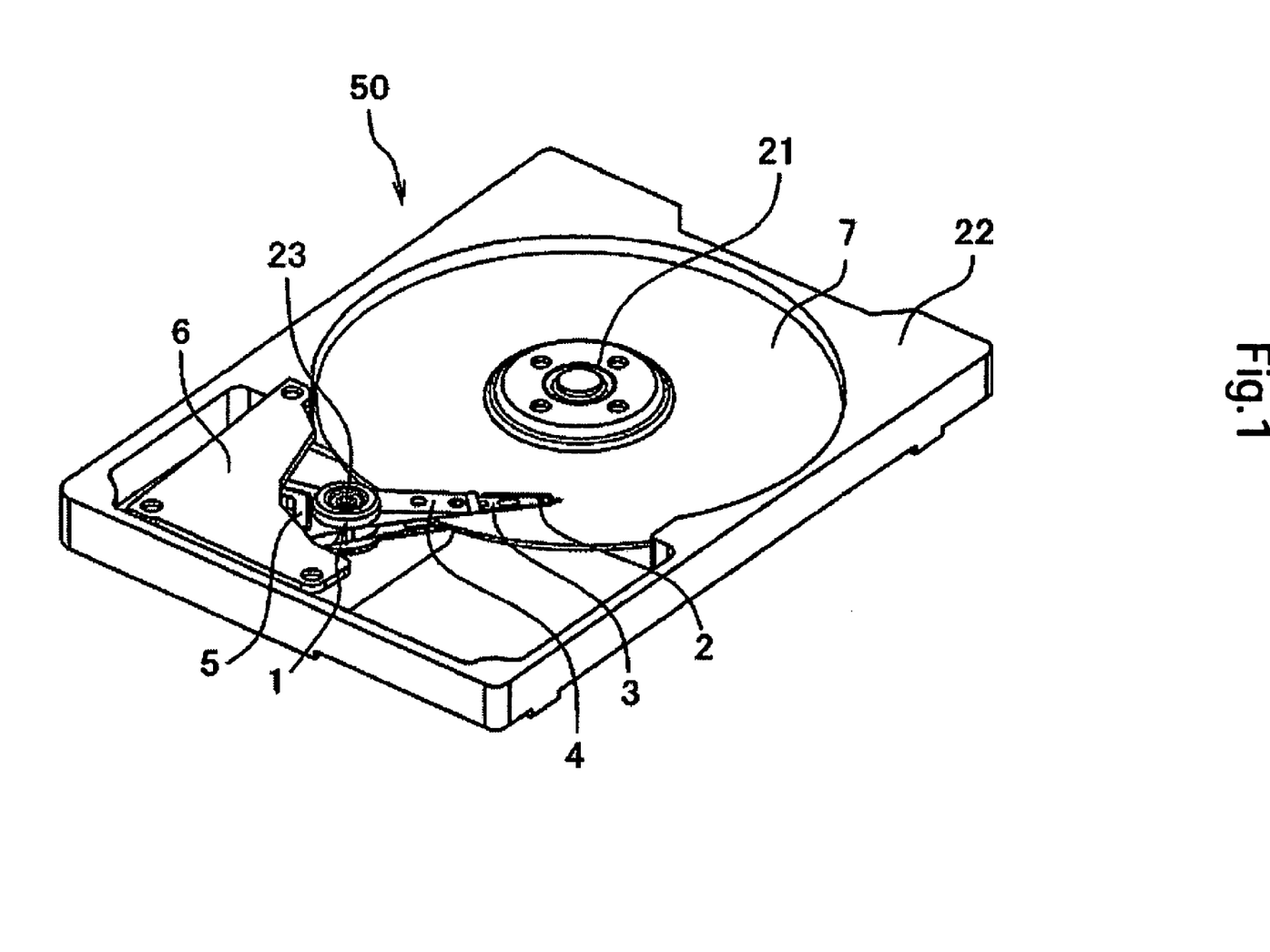
FIG. 1 is a perspective view showing a magnetic disk device according to a first embodiment of the invention.

A magnetic disk device according to a first embodiment of the invention will be described with reference to FIGS. 1 to 13. A whole constitution of a magnetic disk device 50 according to the embodiment will be described with reference to FIG. 1. FIG. 1 is a perspective view showing a state, in which a base cover of the magnetic disk device 50 is removed. The magnetic disk device 50 comprises a disk 7 that records information, a slider 2 mounting thereon a magnetic head that records or reproduces information from the disk 7, and an actuator 1 mounting thereon the slider 2 on a tip end side thereof turnably so as to move radially of the disk 7.

Magnetic information is recorded on both surfaces of the disk 7, which is rotated at high speed by a spindle motor 21. The spindle motor 21 is supported on a base 22. The slider 2 mounts thereon a record and reproduction element (not shown) that records or reproduces magnetic information, and is constituted so as to perform recording and reproduction in a state of flying above a surface of the disk 7 with a slight clearance therebetween owing to buoyancy generated by high-speed rotation of the disk 7.

The actuator 1 comprises a suspension 3, an arm 4, and a voice coil motor 6. The suspension 3 is constituted to mount the slider 2 on a tip end side thereof, have a base side thereof fixed to the arm 4, and give a predetermined load to the slider 2. The arm 4 holds the suspension 3 on a tip end side thereof, and turnably supported on a shaft 23 fixed to the base 22. The arm 4 and the suspension 3 are elongate in shape, and extend in this order from the shaft 23. The voice coil motor 6 serves as a drive source that turns and drives the suspension 3 and the arm 4, and comprises a voice coil 5. The voice coil 5 is fixed to the arm 4 through a board portion 5a (FIG. 2) and supported on the shaft 23 to be able to turn along with the arm 4.

In this manner, the actuator 1 is supported to freely turn about the shaft 23 and constituted so that a drive force by the voice coil motor 6 provided on an opposite side to the arm 4 positions the slider 2 in an optional radial position on the disk 7 to have information recorded on the disk 7 or reproduced from the disk 7.

Figure 2:
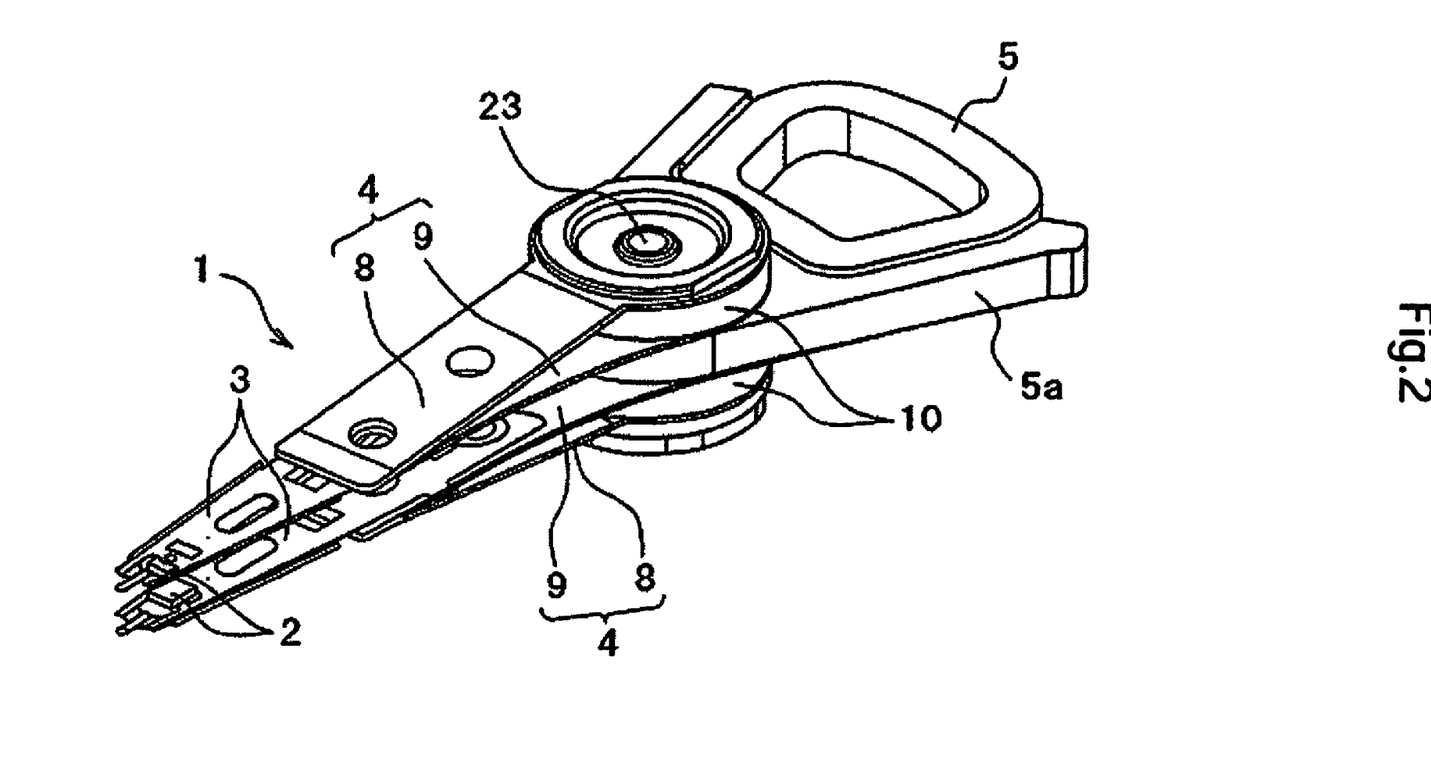
FIG. 2 is a perspective view showing an actuator of the magnetic disk device of FIG. 1.
Figure 3:
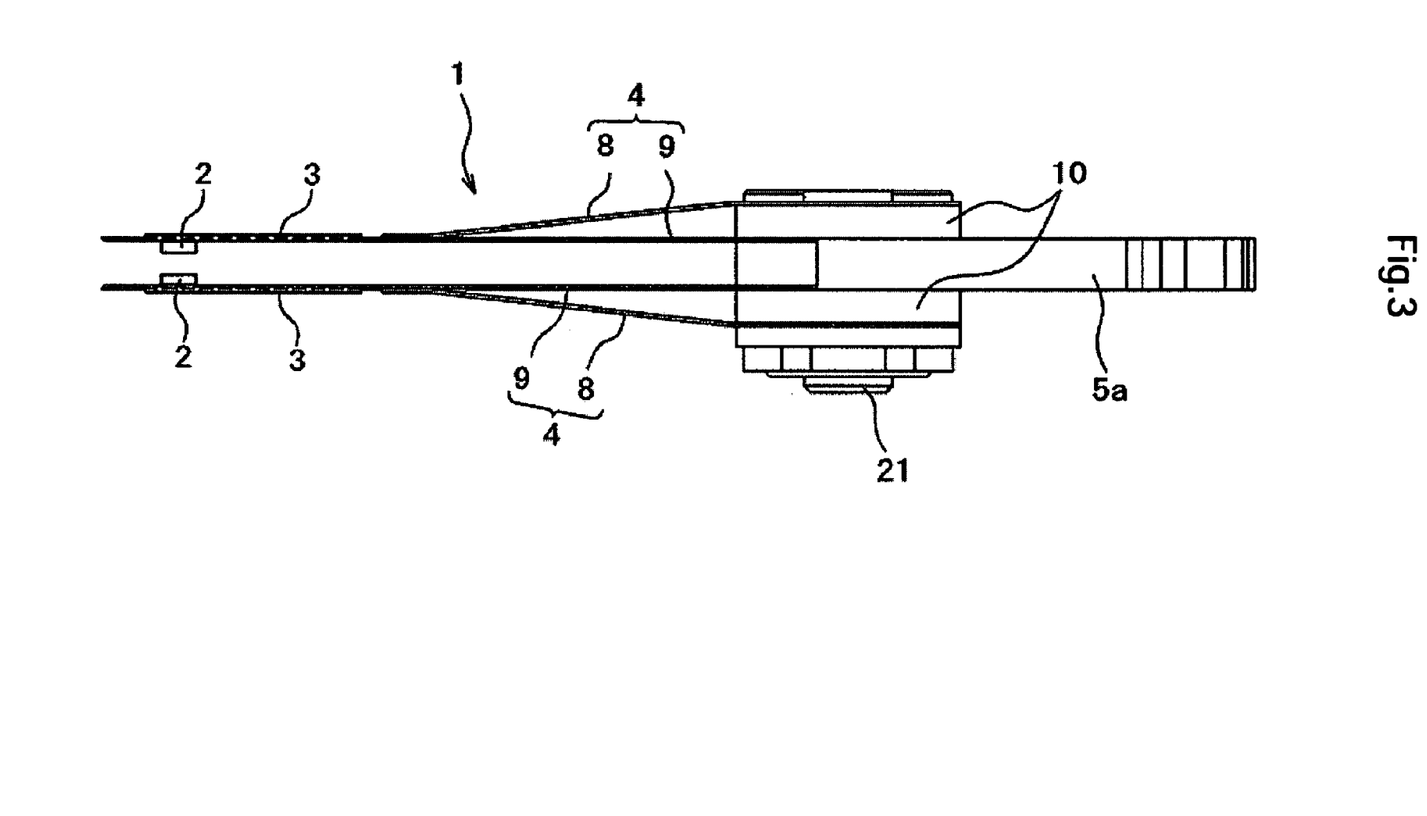
FIG. 3 is a side view showing the actuator of FIG. 2.

A specific construction of the actuator 1 will be described with reference to FIGS. 2 and 3. FIG. 2 is a perspective view showing the actuator 1 put in an independent state, and FIG. 3 is a side view of FIG. 2.

The arm 4 comprises two arm portions 8, 9 juxtaposed in a direction perpendicular to a surface of the disk 7 and extending toward the suspension 3. The two arm portions 8, 9 are set such that a spacing therebetween on a side of supported portions thereof in the direction perpendicular to a surface of the disk is larger than a spacing therebetween on a side of the slider 2 in the direction perpendicular to the surface of the disk. According to the embodiment, since the two arm portions 8, 9 are formed by stacking two sheet members, in the following description the sheet member on a side toward a disk to constitute the arm portion 8 is sometimes called an outer arm 8 and the sheet member on the other side to constitute the arm portion 9 is sometimes called an inner arm 9.

The outer arm 8 and the inner arm 9 are juxtaposed in the direction perpendicular to the surface of the disk and formed in a manner to be elongated from the shaft 23 toward the suspension 3. The outer arm 8 and the inner arm 9 are joined together on the side of the slider and supported to be separate on the side of the supported portions thereof. Specifically, the outer arm 8 and the inner arm 9 are fixed together on the side of the slider 2 by means of welding or bonding, and the outer arm 8 and the inner arm 9 are fixed together on a side toward the turning shaft to be spaced from each other with a spacer 10 therebetween. The outer arm 8 and the inner arm 9 together with the spacer 10 are supported on the shaft 23 to be able to turn. While the outer arm 8 and the inner arm 9 are substantially the same in planar shape, the outer arm 8 is provided to be larger in length than the inner arm 9, the inner arm 9 is provided substantially in parallel to the surface of the disk, and the outer arm 8 is provided to be inclined relative to the surface of the disk. The suspension 3 is provided to extend substantially in parallel to the inner arm 9.

Arm assemblies each composed of a set of the slider 2, the suspension 3, the outer arm 8, the inner arm 9, and the spacer 10 are provided symmetrically in pair on both sides of the disk 7, and the pair of arm assemblies constitute the actuator 1. The board portion S$a$ of the voice coil 5 is fixed to the inner arm 9, and the voice coil motor 6 drives and rotates the board portion 5$a$ to turn the arm assemblies. Also, the board portion 5$a$ is interposed between the two arm assemblies and fixed to the respective inner arms 9. The outer arms 8, the inner arms 9, and the spacers 10 in the two arm assemblies are supported on the same shaft 23 to be able to turn together with the board portion S$a$ of the voice coil 5, and thus turn as the board portion 5$a$ turns.

Subsequently, the principle of operation of the suspension and arm mechanism according to the present invention will be described with reference to FIGS. 4 to 7.

Figure 4:
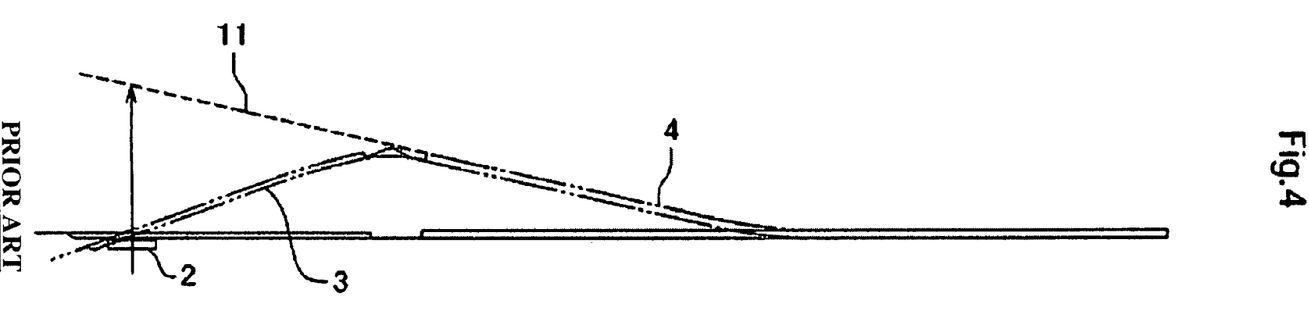
FIG. 4 is a schematic view showing a primary bending mode in the prior art.

FIG. 4 is a view showing deformation of an arm 4 and a suspension 3 when an impact is applied to a conventional magnetic disk device. The arm 4 having a cantilever structure is large in deformation on a side (tip end side) of the arm 4 toward a slider as shown in FIG. 4. Since the arm 4 of a conventional type has a cantilever structure in the form of a single arm, an imaginary extension 11 of the arm 4 is displaced in a direction away from a disk 7. Therefore, when an impact force is applied, the arm 4 of a conventional type is deformed in a direction in which a slider 2 mounted on the suspension 3 is peeled off from the disk 7.

Figure 5:
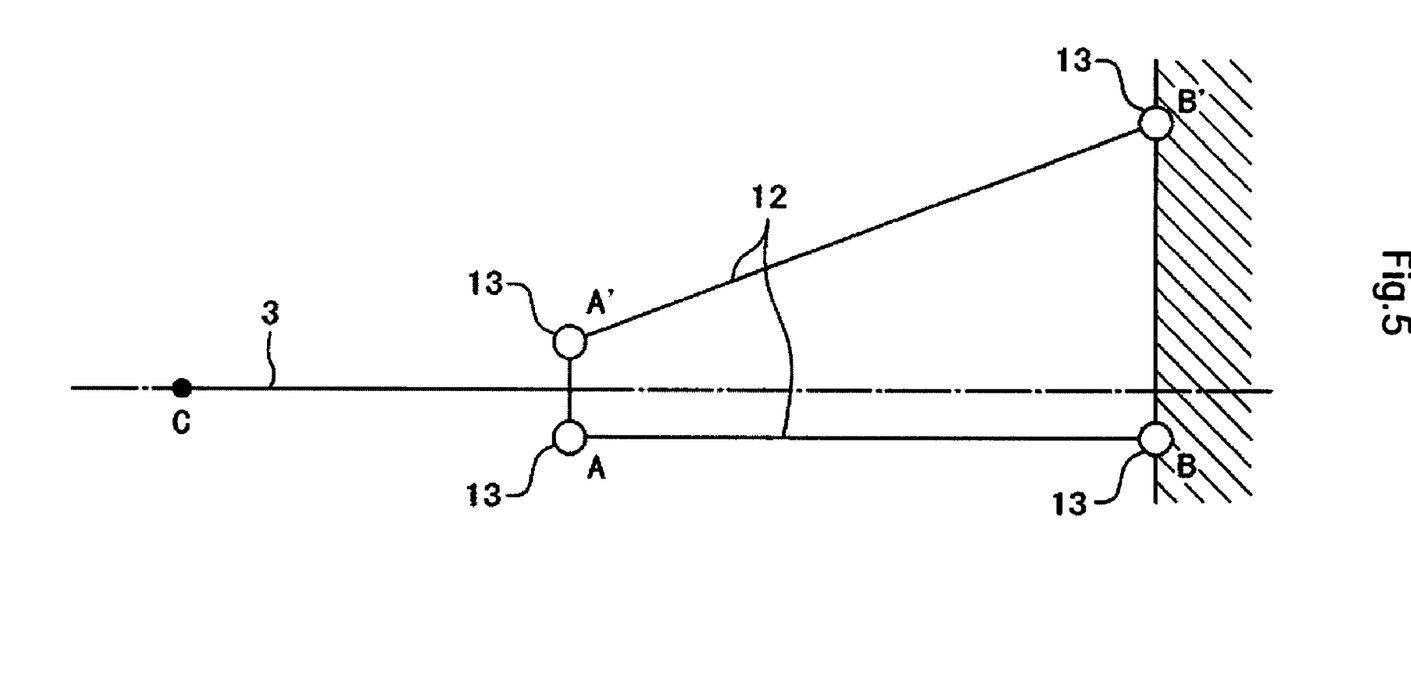
FIG. 5 is a schematic view showing a four-link mechanism in a normal state showing the principle of operation of the invention.
Figure 6:
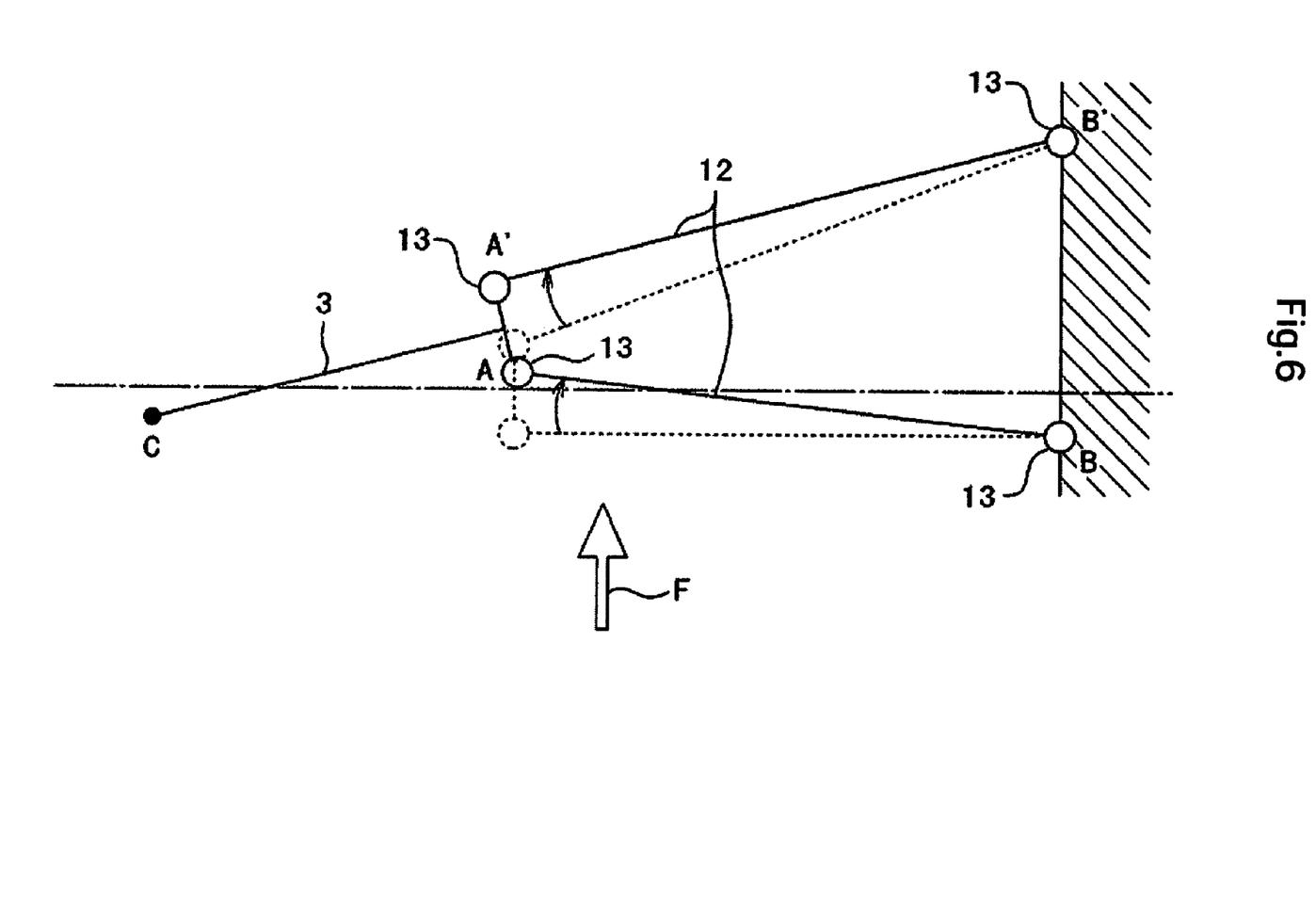
FIG. 6 is a schematic view showing a four-link mechanism in a state of application of an impact force showing the principle of operation of the invention.

In contrast, when an arm 4 is constituted by a four link mechanism composed of a rigid portion 12 and a turning portion 13 as shown in FIGS. 5 and 6 and a spacing of A-A' is smaller than a spacing of B-B', a suspension 3 is not deformed in a direction to be peeled off from a disk 7 but deformed in a direction to be pushed against the disk. FIGS. 5 and 6 are schematic views illustrating the principle of operation of the actuator 1, FIG. 5 showing a normal state, and FIG. 6 showing a state of application of an impact force.

In the case where an impact force F shown in FIG. 6 acts, deformation is generated as represented by solid lines from dotted lines shown in FIG. 6 due to the geometric relationship of the rigid portion 12 and the turning portion 13, thus enabling displacement of a C point, which is an imaginary position of a magnetic head, on an opposite side to a direction, in which the impact force F is applied.

Figure 7:
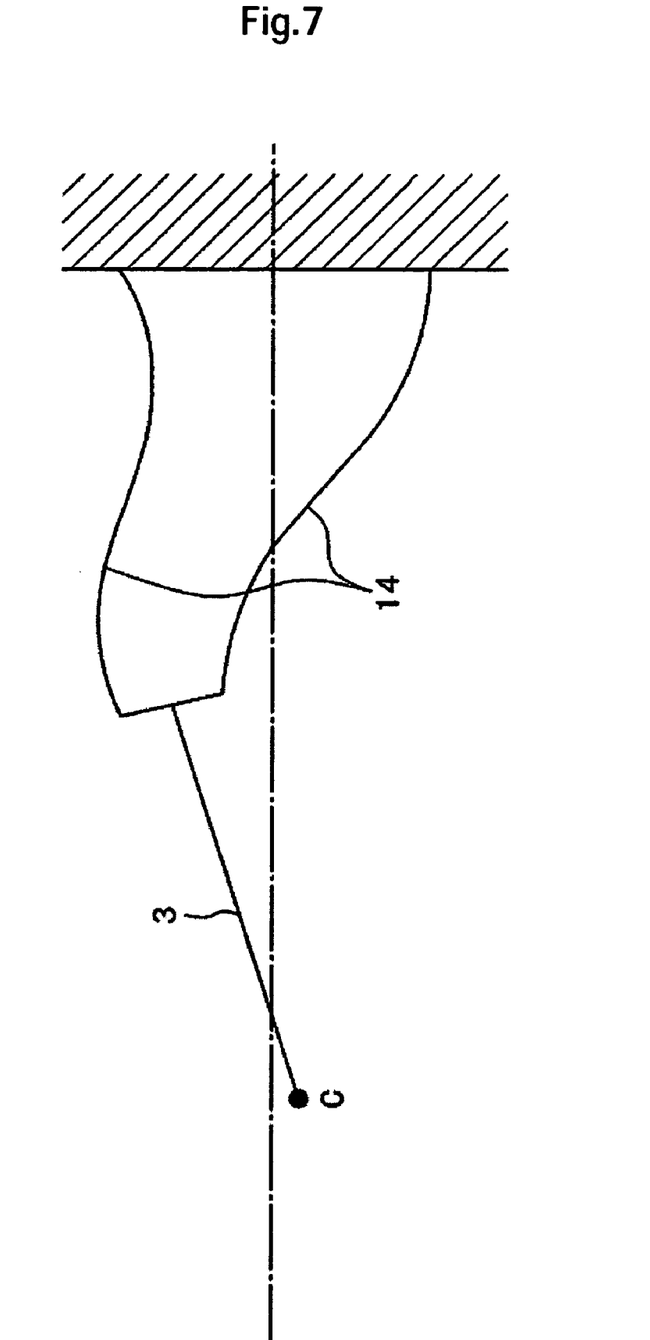
FIG. 7 is a schematic view showing an actuator with an arm of a beam structure at the time of application of an impact force showing the principle of operation of the invention.

In addition, in the case where the arm 4 is composed of an elastic beam 14 in place of the rigid portion 12 and the turning portion 13, the elastic beam 14 is deformed as shown in FIG. 7, thus enabling displacement of a C point, which is a position of a magnetic head, on an opposite side to a direction, in which the impact force F is applied.

While the outer arm 8 and the inner arm 9 in the embodiment are closely fixed together on the side of the slider as shown in FIG. 3, an actual point of action of a force can be considered to be central in the respective arms 8, 9 in a thickness-wise direction, so that the outer arm 8 and the inner arm 9 can be considered to be spaced from each other the sum of halves of respective sheet thicknesses on the side of the slider 2, and assume a deformed configuration equivalent to that of the elastic-beam structure shown in FIG. 7. This means that deformation of the arm 4 in the magnetic disk device according to the embodiment makes it possible to generate a force not in a direction in which the slider 2 is peeled off from a disk 7, but in a direction in which the slider 2 is conversely pushed against the disk 7, and makes it hard for head jump to generate, whereby it is possible to improve the impact resistance performance.

Figure 8:
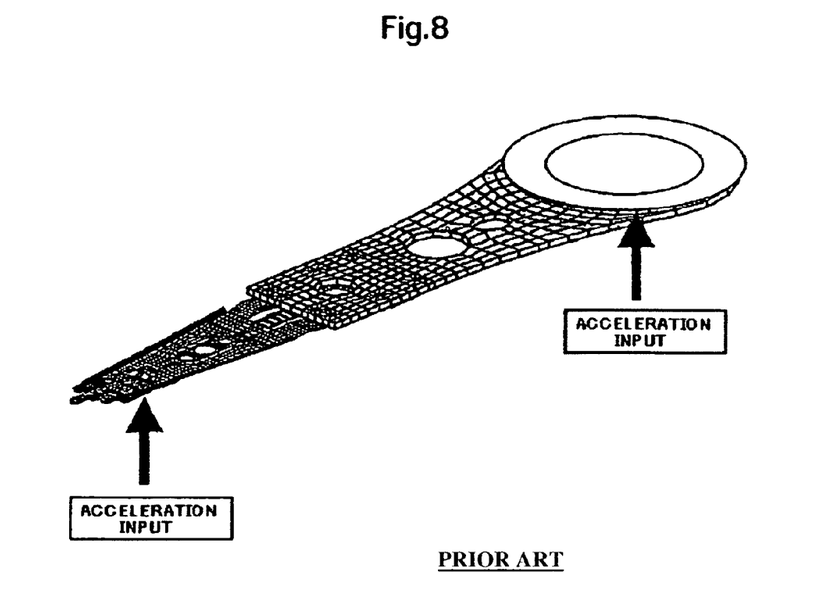
FIG. 8 is a view showing a finite element model of the prior art.
Figure 9:
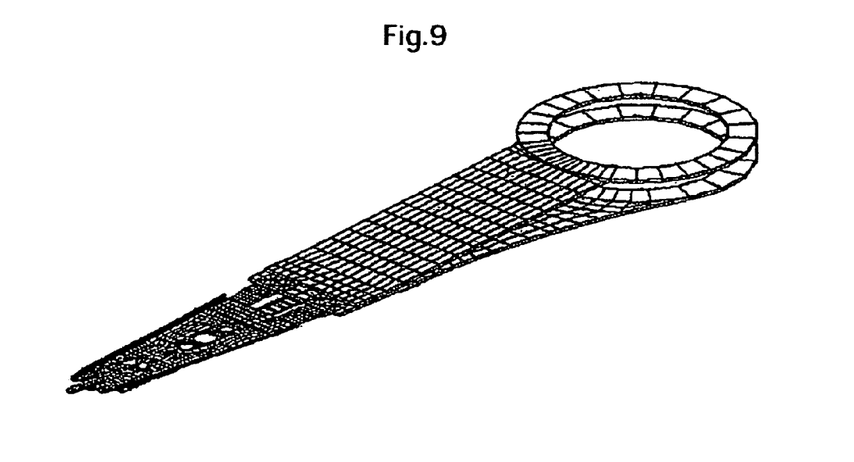
FIG. 9 is a view showing a finite element model of the first embodiment of the invention.

In order to confirm the principle of the invention described above, time history response analysis was performed making use of the finite element method. FIG. 8 shows an analytic model for the arm 4 of a conventional cantilever structure, a suspension 3, and a slider 2, and a method of input, and FIG. 9 shows an analytic model in the embodiment.

Figure 10:
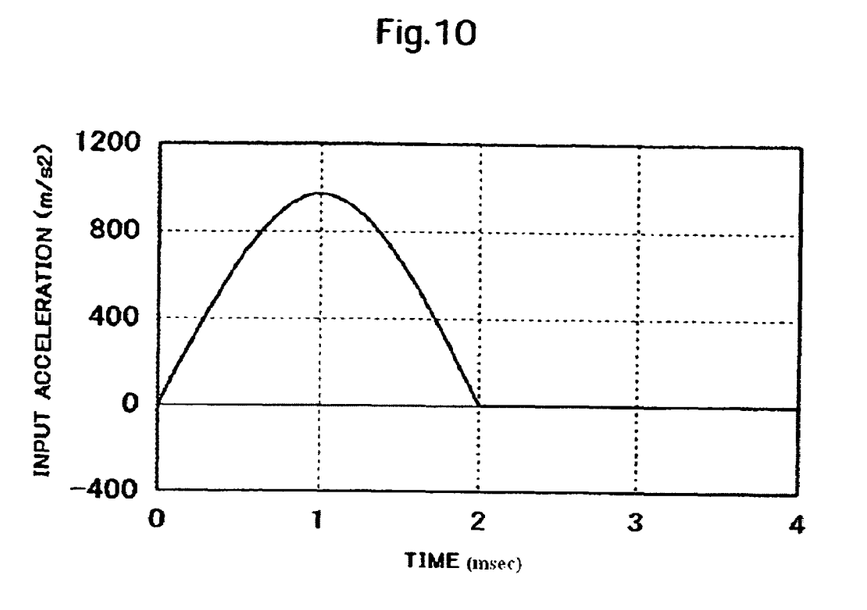
FIG. 10 is a view showing an acceleration input in the finite element analysis of the first embodiment of the invention.

In a conventional type, an arm 4 has a thickness of the order of 0.25 mm to 0.3 mm, and a model having a thickness of 0.25 mm is fabricated in the example shown in FIG. 8. In contrast, since the outer arm 8 and the inner arm 9 according to the embodiment are arranged top and bottom, the arm 4 is fundamentarily increased in stiffness in a vertical direction (direction perpendicular to a surface of a disk), so that it is possible to reduce the upper arm 8 or the lower arm 9 in thickness. Thereby, both the outer arm 8 and the inner arm 9 in an example shown in FIG. 9 have a thickness of 0.1 mm. Input is composed of sine half-wave input having a width of 2 millisecond and an amplitude of 980 m/s$^2$ (100 G) as shown in FIG. 10, and simulates an acceleration input at the time of application of an impact to be input to an end of the arm 4 fixed to the actuator and a surface of the slider 2 opposed to a disk as shown in FIG. 8. Output is given by an inertial force generated on the surface of the slider 2 opposed to a disk.

Figure 11:
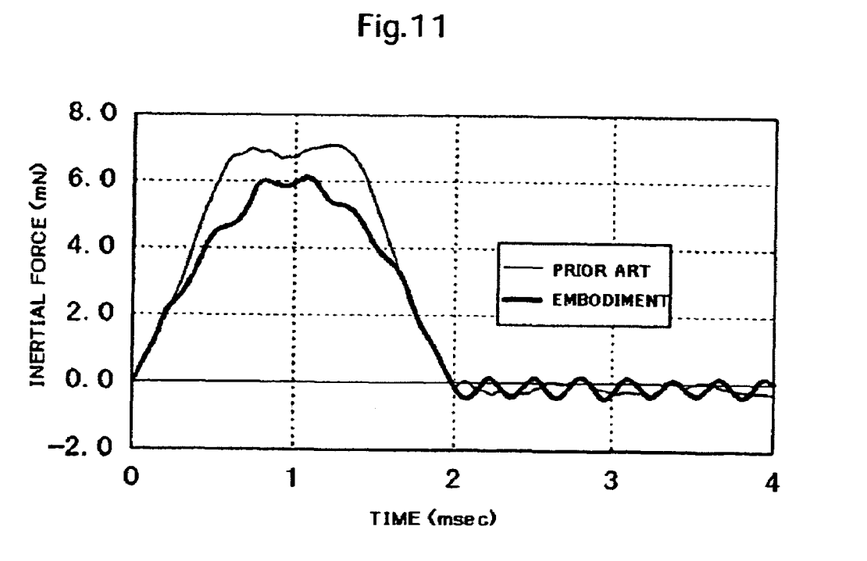
FIG. 11 is a view showing an inertial force acting on a surface of a slider opposed to a disk in the first embodiment of the invention and in the prior art, the inertial force being calculated with the finite element method.

FIG. 11 shows the results. In the results for the conventional type, a force having a maximum value is generated in 1.24 millisecond. This means that when acceleration of 980 m/s$^2$ is input, a push load of the suspension 3 is decreased by 7.3 mN. Thereby, for example, when a push load of the suspension 3 is 20 mN, the push force becomes 0 in the case where an acceleration input of 2684 m/s$^2$ (274 G) is given, and the slider 2 jumps up from a surface of a disk, that is, head jump is generated in the case where an acceleration input greater than or equal to the former acceleration input is given. While a force in the conventional type has a maximum value of 7.3 mN, a force in the embodiment has a maximum value of 6.1 mN and thus amounts to the order of 80% of the force in the conventional type even in case of the same acceleration input. Since this means that an inertial force applied to a surface of the slider 2 opposed to a disk amounts to the order of 80% of that in the conventional type, an example of analysis in FIG. 11 indicates that an acceleration giving rise to head jump is 1.25 times that in the conventional type to enhance the impact resistance performance.

Figure 12:
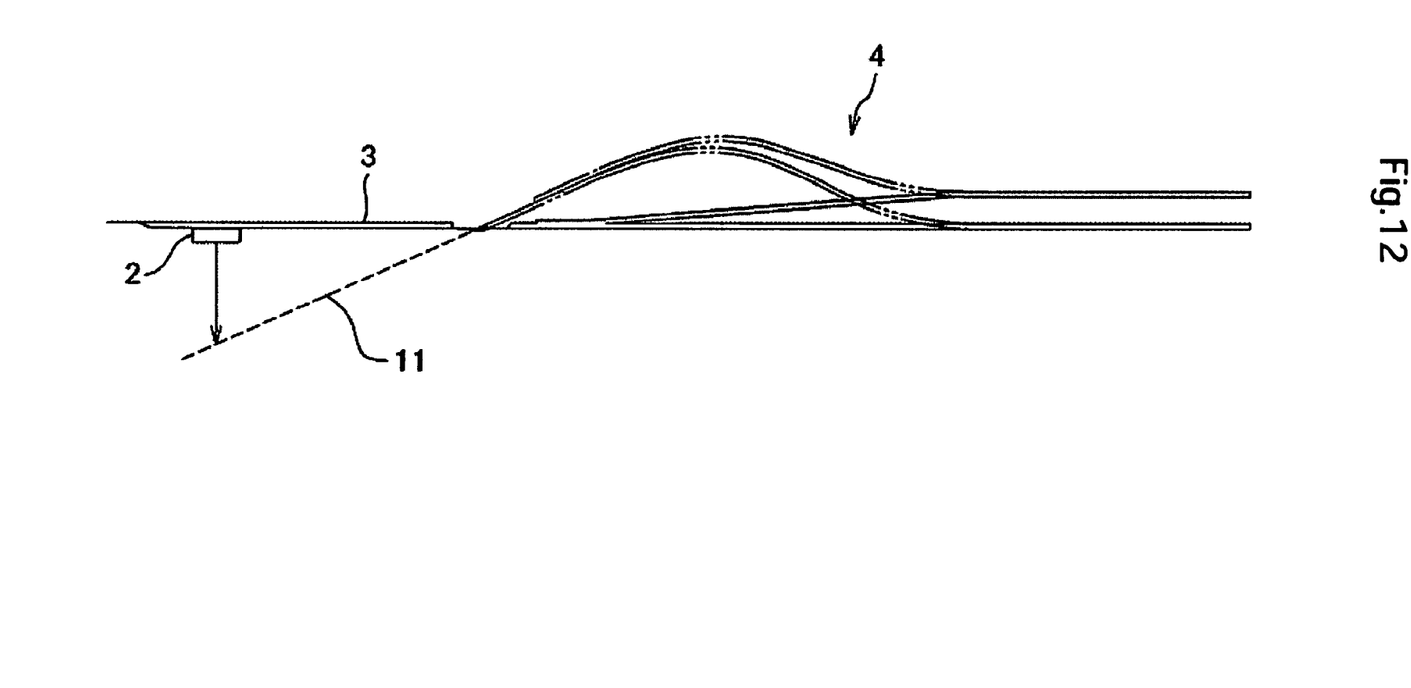
FIG. 12 is a view showing a primary bending mode in the first embodiment of the invention.

FIG. 12 shows a primary bending mode of the shape used in the example of analysis in FIG. 11. It is seen from FIG. 12 that the arm itself is deformed in shape in the same manner as shown in FIG. 7, which illustrates the principle. Further, it is seen from FIG. 12 that an imaginary extension 11 of the arm is directed to push the slider 2 against the disk 7 and the impact resistance performance is enhanced by modification of the arm portion.

Figure 13:
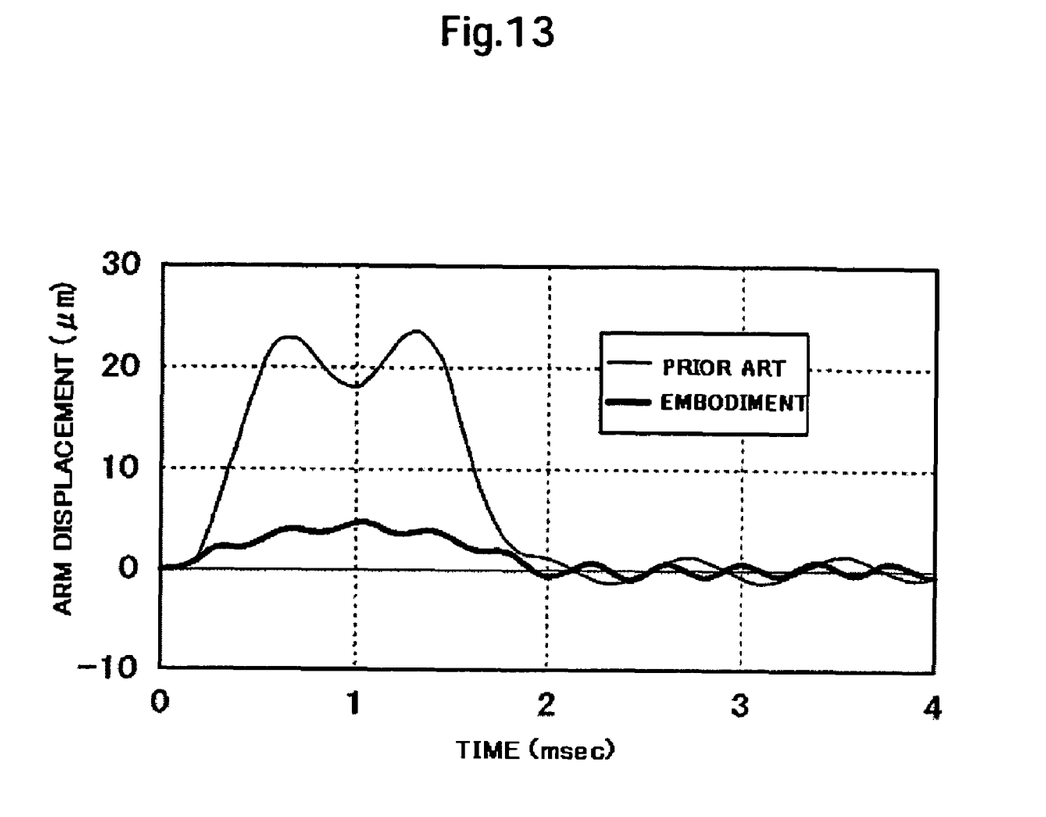
FIG. 13 is a view showing a maximum displacement of an arm in the first embodiment of the invention and in the prior art, the maximum displacement being calculated with the finite element method.

FIG. 13 shows a maximum displacement of the arm 4 when the same calculation as the analysis in FIG. 11 is done. While a maximum displacement in the conventional type is 24 μm at the time of an input acceleration of 980 m/s$^2$, it is 5.2 μm in the embodiment. That is, it is indicated that the arm 4 in the embodiment is hard to collide against the disk 27 since the arm 4 is small in displacement also at the time of input of an impact.

It is seen from the results in FIGS. 11 and 13 that the embodiment is adequately effective in terms of impact resistance performance. Further, in the examples of analysis in FIGS. 11 and 13, in which a single arm 4 of 0.25 mm is provided in the conventional type and two arms 4 of 0.1 mm are provided in the embodiment, the arms 4 themselves in the embodiment can be made further small in mass and moment of inertia about the actuator turning shaft. Since a small moment of inertia means that the actuator 1 quickly moves even with the same drive force of the voice coil motor 6, there is also an advantage that travel time over predetermined recording tracks decreases and access time decreases.

As described above, it is possible according to the embodiment to realize a magnetic disk device, which comprises a disk 7 that records information, a slider 2 mounting thereon a magnetic head that records or reproduces information from the disk 7, and an actuator 1 mounting thereon the slider 2 on a tip end side thereof turnably so as to move radially of the disk 7, and in which the actuator 1 comprises a suspension 3 mounting the slider 2 on a tip end side thereof to give a predetermined load to the slider 2, and an arm 4 holding the suspension 3 and supported to be able to turn, the arm 4 comprises two arm portions 8, 9 juxtaposed in a direction perpendicular to a surface of the disk, and a spacing between the two arm portions 8, 9 on a side of supported portions thereof in the direction perpendicular to the surface of the disk is made larger than that on a side of the slider in the direction perpendicular to the surface of the disk, so that head jump is suppressed at the time of application of an impact and thus the impact resistance performance is made excellent.

Also, since the two arm portions 8, 9 are composed of two sheet members, the two sheet members are joined together on the side of the slider and supported away from each other on a side of supported portions thereof, the two sheet members are fixed on a side toward a turning shaft with a spacer therebetween, and the two sheet members together with the spacer are supported on the shaft, a simple construction enables employing the invention.

In addition, since the arm 8 on an opposite side to a surface of a disk is made larger in length than the arm 9 toward the surface of the disk, a force to push the slider 2 against the surface of the disk can be increased at the time of application of an impact as compared with the case where the both arms 8, 9 have the same length.

Furthermore, since the arm 9 toward the surface of the disk is provided substantially in parallel to the surface of the disk, the arm 8 on the opposite side to the surface of the disk is provided to be inclined relative to the surface of the disk, and the suspension 3 is provided to extend substantially in parallel to the arm 9 toward the surface of the disk, design is easy and a force to push the slider 2 against the surface of the disk can be increased at the time of application of an impact as compared with the case where the both arms 8, 9 are inclined.

Figure 14:
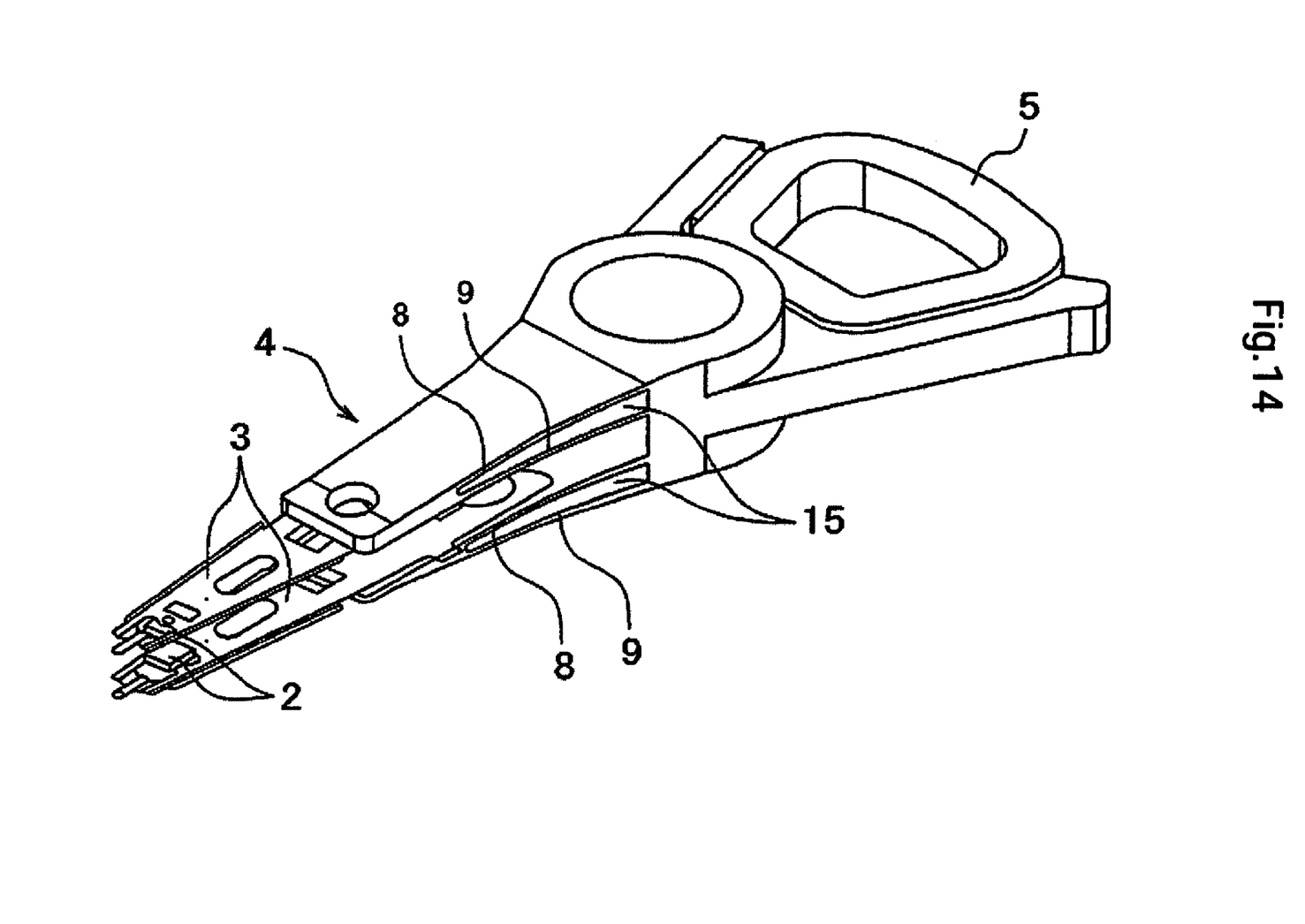
FIG. 14 is a perspective view showing an actuator in a second embodiment of the invention.
Figure 15:
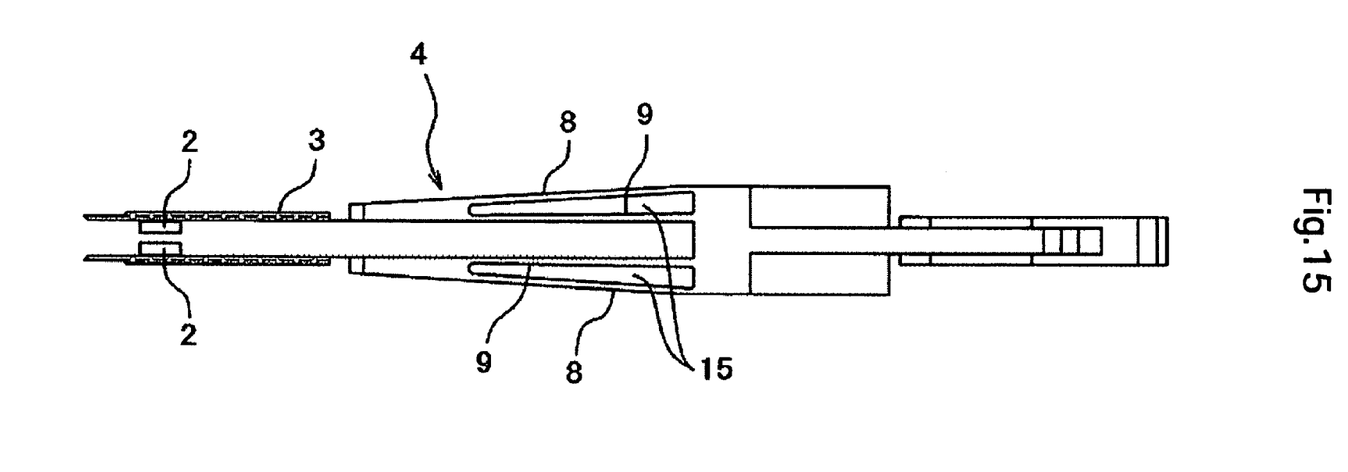
FIG. 15 is a side view showing the actuator of FIG. 14.

Subsequently, a second embodiment of the invention will be described with reference to FIGS. 14 and 15. FIG. 14 is a perspective view showing an arm 4 in the second embodiment of the invention, and FIG. 15 is a side view of FIG. 14. The second embodiment is different from the first embodiment as described below, and fundamentarily the same as the first embodiment in other points.

While the invention is applied in the first embodiment to a lamination type actuator, in which the respective arms 4 comprise independent parts, the invention is applied in the second embodiment to a unitary type actuator, in which all arms 4 are made a single part. In the second embodiment, holes 15 are formed in the side of a single arm 4 to provide for arm portions 8, 9. Also, in the second embodiment, the arm 4 is the same in structure as that in the first embodiment, so that it is possible to enhance the impact resistance performance. Thereby, the number of parts can be reduced, so that it is possible to reduce a manufacturing cost simultaneously with a decrease in dispersion in manufacture.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk device comprising a disk that records information,
   a slider mounting thereon a magnetic head that records or reproduces information from the disk, and
   an actuator mounting thereon the slider on a tip end side thereof turnably so as to move radially of the disk, and
   wherein the actuator comprises a suspension mounting the slider on a tip end side thereof to give a predetermined load to the slider, and an arm holding the suspension and supported to be able to turn,
   wherein the arm comprises two arm portions juxtaposed in a direction perpendicular to a surface of the disk, and a spacing between the two arm portions on supported sides thereof in the direction perpendicular to the surface of the disk is made larger than another spacing between the two arm portions on a side of the slider in the direction perpendicular to the surface of the disk; and
   wherein the arm portion on an opposite side to a surface of the disk is larger in length than the arm portion on a side toward the surface of the disk.

2. The magnetic disk device according to claim 1, wherein the arm portion on the side toward the surface of the disk is provided substantially in parallel to the surface of the disk and the arm portion on the opposite side to the surface of the disk is provided to be inclined relative to the surface of the disk.

3. The magnetic disk device according to claim 2, wherein the suspension is provided substantially in parallel to the arm portion on the side toward the surface of the disk.

4. The magnetic disk device according to claim 2, wherein the suspension and the arm on the actuator are provided to be symmetrical on both sides of the disk.

5. The magnetic disk device according to claim 1, wherein the actuator comprises the suspension, the arm, and a voice coil motor, the two arm portions are formed from two sheet members, the two sheet members are joined together on a side of the slider and fixed on a side of a turning shaft with a spacer therebetween, the suspension and the arm on the actuator are provided to be symmetrical on both sides of the disk, a board portion of the voice coil is fixed between the arm portions on the both sides, and the two sheet members, the spacer, and the board portion of the voice coil are supported on the same shaft to be able to turn.

6. The magnetic disk device according to claim 1, wherein the two arm portions are formed from elastic beams.

7. The magnetic disk device according to claim 6, wherein the two arm portions formed from two elastic beams are joined together on a side of the slider and supported to be separate from each other on the supported sides.

8. The magnetic disk device according to claim 7, wherein the arm portion on the side toward the surface of the disk is provided substantially in parallel to the surface of the disk and the arm portion on the opposite side to the surface of the disk is provided to be inclined relative to the surface of the disk.

9. The magnetic disk device according to claim 8, wherein the suspension is provided substantially in parallel to the arm portion on the side toward the surface of the disk.

10. The magnetic disk device according to claim 8, wherein the suspension and the arm on the actuator are provided to be symmetrical on both sides of the disk.

11. The magnetic disk device according to claim 1, wherein the arm is formed from a single sheet member, which decreases in thickness toward the slider, and an opening is provided on the sheet member to form the two arm portions juxtaposed in the direction perpendicular to the surface of the disk.

12. The magnetic disk device according to claim 1, wherein the two arm portions are formed from two sheet members, and the two sheet members are joined together on a side of the slider and supported to be separate from each other on the supported sides.

13. The magnetic disk device according to claim 12, wherein the two sheet members are fixed on a side of a turning shaft with a spacer therebetween and the two sheet members together with the spacer are supported on the shaft.

14. The magnetic disk device according to claim 12, wherein the arm portion on the side toward the surface of the disk is provided substantially in parallel to the surface of the disk and the arm portion on the opposite side to the surface of the disk is provided to be inclined relative to the surface of the disk.

15. The magnetic disk device according to claim 14, wherein the suspension is provided substantially in parallel to the arm portion on the side toward the surface of the disk.

16. The magnetic disk device according to claim 14, wherein the suspension and the arm on the actuator are provided to be symmetrical on both sides of the disk.

* * * * *